Feb. 4, 1969 C. E. UPPER 3,425,224
PROPELLANT INJECTOR MECHANISM FOR ROCKET ENGINES
Filed July 8, 1966
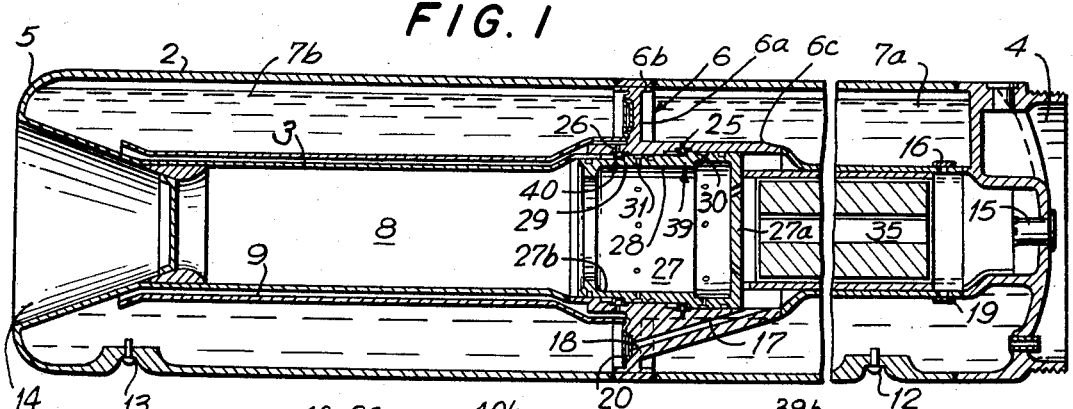
FIG. 1
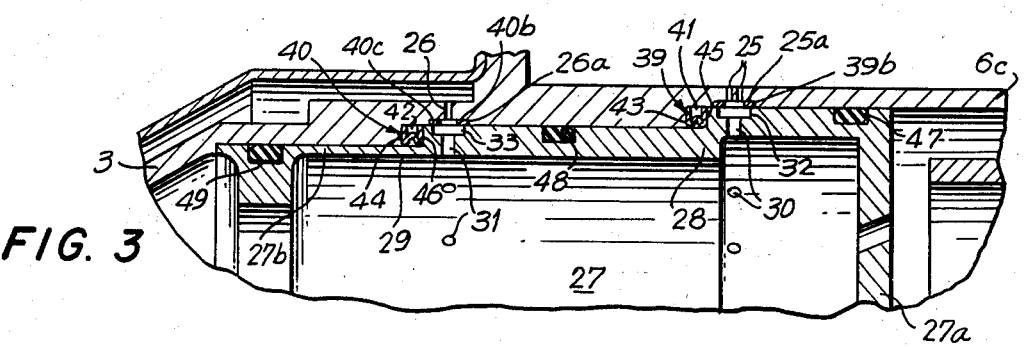
FIG. 2
FIG. 3
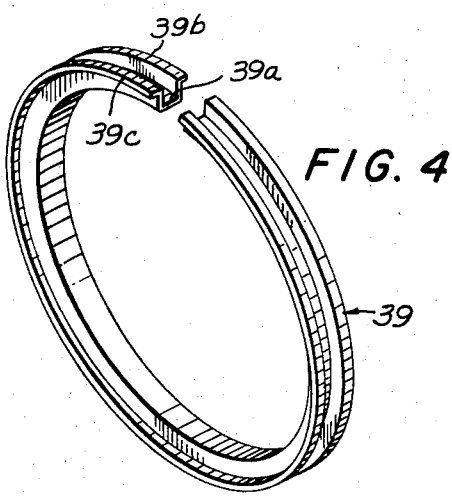
FIG. 4
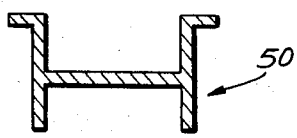
FIG. 5
INVENTOR.
CHARLES E. UPPER
BY
Curtis, Morris & Safford
ATTORNEYS United States Patent Office 3,425,224
Patented Feb. 4, 1969

3,425,224
PROPELLANT INJECTOR MECHANISM FOR
ROCKET ENGINES
Charles E. Upper, Williamsville, N.Y., assignor to Thiokol Chemical Corporation, Bristol, Pa., a corporation of Delaware
Filed July 8, 1966, Ser. No. 563,917
U.S. Cl. 60—258                    9 Claims
Int. Cl. F02k 9/02; F02g 1/00

The present invention relates to rocket engines and more particularly to improvements in the injector mechanism for controlling the delivery of liquid propellant to to the combustion chamber.

Conventional injection control mechanisms for packaged type rocket engines have frangible closure cups for closing outlet ports in a wall of the propellant container and a slide for shearing the closure cups to open the ports. In these prior constructions, the slide has recesses into which the cups project and orifices of a size to overlie the outlet ports which are spaced from the recesses longitudinally of the slide. When the slide is actuated the cups are sheared and the orifices in the slide are moved into alignment with the outlet ports in the wall.

The area of the outlet ports controls the flow of liquid therethrough and because each port is closed by a cup, the ports have a relatively large diameter. Furthermore, the slide must have recesses and orifices of a correspondingly large diameter which are spaced from each other. Thus, the slide must be moved for a distance at least equal to the diameter of the cup plus the space between the edges of the port and recesses into which the cups project in order to shear the cups. During such a shearing operation, the slide is accelerated for a period of time proportional to its longitudinal movement which continually increases the momentum of the slide. Difficulty has heretofore been experienced in stopping the slide after it has sheared the cups without producing a sudden shock on the rocket engine. Such sudden shocks are undesirable as they are apt to produce a force on the rocket engine which may affect its trajectory. To avoid such a result, shock absorbing elements of a compressible elastomeric material have heretofore been used between the end of the slide and a stopping abutment in the engine to brake the movement of the slide and absorb its kinetic energy adjacent the end of its stroke.

One of the objects of the present invention is to provide an improved construction in an injector control mechanism to absorb the kinetic energy produced by the acceleration of the slide to prevent a sudden stop and resulting shock force on the engine.

Another object is to provide an improved injector control mechanism in which the sheared closure acts as a cushion to absorb the kinetic energy of the slide.

Another object is to provide an improved construction in an injector control mechanism of the type indicated which permits the use of a slide having less length and weight and a shorter path of travel to shear the closure so as to produce less kinetic energy to be absorbed.

Still another object is to provide an improved injector control mechanism of the type indicated which is of simple and compact construction, economical to manufacture and one which is reliable in operation to open the outlet ports in the wall of the engine while producing less kinetic energy than injector control mechanisms previously used.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

In the drawings:

FIGURE 1 is a longitudinal sectional view of a packaged type rocket engine incorporating the novel injector control mechanism of the present invention;

FIGURE 2 is an enlarged sectional view of a portion of the rocket engine casing and showing the stepped peripheries of the wall and slide to form annular spaces therebetween and the frangible closures located in the spaces between the shoulders formed by the steps;

FIGURE 3 is a view similar to FIGURE 2 showing the slide actuated to shear the closures and align the orifices in the slide with the ports in the wall and further showing the sheared closures crushed between shoulders on the slide and wall of the rocket engine to cushion the movement of the slide as it reaches the end of its shearing stroke;

FIGURE 4 is a perspective view of a closure of preferred construction in the form of a continuous U-shaped channel extending around the entire periphery of the wall of the rocket engine to cover a narrow space longitudinally thereof; and FIGURE 5 is a transverse sectional view of a sealing element of modified construction in cross section to increase its resistance to deformation.

FIGURE 1 of the drawing illustrates an injector mechanism incorporating novel features of the present invention applied to a packaged type liquid propellant rocket motor as described and claimed in the U.S. Letters Patent to A. Sherman et al. No. 3,094,837, issued June 25, 1963. This rocket motor comprises a casing having an outer peripheral wall 2 and an inner peripheral wall 3 connected between forward and aft end headers 4 and 5 and an intermediate bulkhead 6. These walls define annular tank sections 7a and 7b therebetween and an axially extending combustion chamber 8 within the inner wall. Tubular baffles 9 are provided on the inner wall 3 around the combustion chamber 8 in the aft tank section 7b and extend from the bulkhead 8 rearwardly to the aft header 5. During operation, liquid propellant flows through the passages or baffles 9 to cool the wall of the combustion chamber 8.

Suitable liquid propellants are inhibited red fuming nitric acid (IRNFA) containing approximately 18–23% $NO_2$ as the oxidizer in the tank section 7a, and unsymmetrical di-methyl hydrazine (UDMH) as liquid fuel in tank section 7b, respectively. The tank sections 7a and 7b are provided with filling openings 12 and 13, respectively, which are hermetically sealed after the tank sections have been filled. An exit cone or nozzle 14 is provided at the outlet end of the combustion chamber 8 and an igniter 15 closes the forward end of the combustion chamber.

The bulkhead 6 is in the form of an annular wall of I-shape in cross section having a radial web 6a and longitudinally extending flanges 6b and 6c at the outer and inner ends of the web which are connected to and form part of the outer and inner walls 2 and 3 of the rocket engine casing.

The inner wall 3 of the tank section 7a has a plurality of circumferentially spaced orifices 16 adjacent the forward end thereof for pressurizing the section, while the bulkhead 6 has a plurality of passages 17 from the combustion chamber 8 and terminating in pressurizing orifices 18 at the forward end of tank section 7b for pressurizing that tank section. Orifices 16 and 17 are closed by burst bands 19 and 20, respectively, which are designed to withstand handling loads. The forwardly extending portion of the inner flange 6c of the bulkhead 6 forming a part of wall 3 also is provided with injection ports 25 while the rearwardly extending portion of the flange 6c is provided with injection ports 26. A slide 27 has lands 28 and 29 which overlie the injection ports 25 and 26 during storage, see FIGURES 1 and 2, and orifices 30 and 31 which align with the injection ports when the slide 27 is moved to its firing position, see FIGURE 3.

The slide 27 is in the form of a piston having a head 27a at its forward end and a skirt 27b projecting rearwardly from the head and having the orifices 30 and 31. A gas generator element 35 is mounted in the axial space in the tank 7a forwardly of the combustion chamber 8 and bulkhead 6 for suppling gas under pressure to actuate the piston slide 27. The gas generator 35 in the illustrated embodiment comprises an annular stick of a solid combustible material. The ends of the pressurizing passages 17 for the aft tank section 6b and the ports 16 for the forward tank section 6a are connected to the chamber containing the solid combustible material so that the gaseous products of combustion are delivered at a pressure to burst bands 19 and 20 and enter the forward ends of the tank section 7a and 7b. As thus far described, the invention is substantially identical with that illustrated and described in the Sherman et al, patent, referred to above.

In accordance with the present invention, the inner wall 3 of the rocket engine casing and slide are so shaped as to crush the sheared sealing element therebetween to absorb the kinetic energy of the slide and thereby cushion its movement at the end of a shearing stroke. The invention also includes a construction to reduce the length and weight of the slide as well as length of its stroke to shear the sealing element to reduce the kinetic energy of the slide.

The sealing elements for sealing the outlet 25 and 26 from the tank sections 7a and 7b may be in the form of conventional cups, but preferably are of a construction to reduce the longitudinal dimension along the wall and the movement of the slide necessary to shear the closure. To this end, the sealing elements 39 and 40 are in the form of narrow circular bands adapted to extend around the entire periphery of the inner wall 3 of the rocket engine casing. Because of the continuous form of the sealing elements 39 and 40, a large number of small outlet ports 25 and 26 may be provided in the wall of the casing to give the required outlet area within a narrow space along the wall. Such a sealing band 39 is illustrated in FIGURE 4 and, as the bands 39 and 40 are identical, a description of the band 39 will suffice for the band 40. Each of the sealing bands 39 and 40 have a U-shaped sealing trough 39a and 40a with flanges 39b or 40b and 39c or 40c projecting at right angles to the walls of the U-shape trough. The flanges 39b and 39c seat in a recess 25a and flanges 40b and 40c seat in a recess 26a after which the ends are joined, see FIGURE 2, at the wall around the outlet ports 25 and 26 so that the flanges are flush with the inside surface of the bulkhead flange 6c constituting a continuation of the inner wall 3 of the rocket engine casing. The sealing bands 39 and 40 may be discontinuous as shown in FIGURE 4 to adapt its ends to be telescoped to insert it into the recess 25a or 26a, or the band may be continuous and the bulkhead 8 shrunk onto its periphery. In either case, the sealing bands 39 and 40 are furnace brazed to the wall to close the injection ports 25 and 26 with the U-shape troughs 39a and 40a projecting from the wall into the combustion chamber. Because the sealing bands 39 and 40 extend continuously around the entire periphery of the combustion chamber 7, the injection ports 25 and 26 in the inner wall 3 may be located more closely together circumferentially so that they cover a narrow space longitudinally of the combustion chamber and thereby reduce the movement of the slide 27 necessary to shear the sealing bands and bring the orifices 30 and 31 in the slide into alignment with the ports 25 and 26. In order to accommodate the large number of ports 25 and 26, annular grooves 32 and 33 are provided in the outer periphery of slide 27 to overlie and connect the groups of orifices 30 and 31.

The bulkhead flange 6c forming a part of wall 3 and slide 27 have a stepped construction to provide adjacent areas of different diameters and thereby provide spaces 41 and 42 therebetween into which the sealing bands 39 and 40 extend. The first step in the inner wall 6c forms a shoulder 43, see FIGURE 2, to the left of the injection ports 25 and a second shoulder 44 to the left of the injection port 26. The step construction of the slide 27 provides a shoulder 45 adjacent the right hand edge of the sealing bands 39 surrounding the injection ports 25 and a shoulder 46 adjacent the edge of the sealing band 40 surrounding the ports 26. The shoulders 43, 45 and 44, 46 oppose each other as shown in FIGURES 2 and 3. Ring seals 47, 48 and 49 are provided between the outer periphery of the slide 27 and flange 6c of wall 3 to prevent flow from the outlet ports 25 and 26 except through the orifices 30 and 31 in the slide 27.

Because of the stepped construction of the wall 3 and outer periphery of the slide 27 the shoulders 45 and 46 on the slide 27 will shear the sealing bands 39 and 40 when the slide is moved from the position illustrated in FIGURE 2 to that illustrated in FIGURE 3. The sheared bands 39 and 40 are then located in the annular spaces 41 and 42 between the shoulders 43, 45 and 44, 46 on the wall and slide and are crushed to absorb the kinetic energy of the slide and gradually stop its movement to avoid any impact force which would be produced if no damping means were provided.

FIGURE 5 shows the cross section of a sealing band 50 of one modified construction which can be used to absorb the kinetic energy of the moving slide 27. The band 50 of modified construction has an H-shaped structure in cross section which offers a greater resistance to crushing than the U-shape form illustrated in FIGURE 4. It will be understood, however, that sealing bands of many different cross sectional shapes can be provided to give the particular resistance characteristics desired. One form of the invention having now been described in detail, the mode of operation is next explained.

For purposes of description, let it be assumed that the tank sections 7a and 7b are filled with liquid oxidizer and fuel and sealed as shown in FIGURE 1 and that the slide 27 is in the forward position shown in FIGURE 2. To initiate operation of the rocket engine the ignitor 15 is actuated to ignite the stick of solid fuel 35. Immediately upon ignition the gas produced by the burning of the fuel 35 will produce a pressure at the forward side of the piston type slide 27 sufficient to burst the bands 19 and 20 so that the gas can enter the forward and rearward tank sections 7a and 7b to pressurize the system. Simultaneously, the pressure acts on the head 27a of the piston slide 27 to move it from the position illustrated in FIGURE 2 to that illustrated in FIGURE 3. Such movement of the slide 27 shears the sealing bands 39 and 40 to open the injection ports 25 and 26 and moves the orifices 30 and 31 in the slide into alignment with said ports. Liquid oxidizer and fuel then flow into the combustion chamber 8 where they ignite and burn to produce a pressure therein. The products of combustion then exhaust through the nozzle 14 at the rearward end of the rocket engine and the difference in pressure produces a forward thrust on the rocket engine.

Due to the narrow width of the continuous sealing bands 39 and 40 extending around the periphery of the combustion chamber 7, the slide 27 has a correspondingly short forward movement to shear the bands and open the injection ports 25 and 26. Furthermore, because of the shorter stroke of the slide 27 to shear the sealing rings 39 and 40, a shorter slide can be used having less weight so that the gases at high pressure will act on the piston slide for a shorter period of time to produce less kinetic energy. Thus, less resistance will be required to stop the movement of the slide after the sealing rings have been sheared.

In addition to controlling the flow of liquid propellant, such as an oxidizer, into the combustion chamber 8, the stepped construction of the wall 3 and cooperating slide 27 provide opposing shoulders 43, 45, and 44, 46 between which the sheared troughs 39a and 40a of the bands 39 and 40 are compressed to gradually decelerate the slide and prevent a sudden impact and resulting shock force on the rocket engine. The spacing of the shoulders 43, 44 on the wall 6c from the shoulders 45 and 46 on the slide 27 is so dimensioned as to shear the sealing elements 39 and 40, and crush the sheared troughs therebetween sufficiently to absorb the kinetic energy by the time that the orifices 30 and 31 are brought into register with the ports 25 and 26 after a minimum movement of the slide.

After the ports 25 and 26 have been opened the oxidizer and fuel continue to flow from the tank sections 7a and 7b into the combustion chamber 8 and propel the rocket engine in its flight path.

It will now be observed that the present invention provides an improved construction in an injector control mechanism which reduces the kinetic energy produced by the slide and absorbs the energy produced to prevent a sudden stop and resultant shock to the rocket engine. It will also be observed that the present invention provides an improved injector control mechanism in which the sheared closure itself acts as a cushion to absorb the kinetic energy of the slide. It will also be observed that the present invention permits the use of a slide having less length and width and a shorter shearing stroke so as to produce less kinetic energy to be absorbed. It will still further be observed that the present invention provides an improved injector control which is of simple and compact construction, economical to manufacture and one which is reliable in operation to open the outlet ports while producing less kinetic energy than structures previously used for this purpose.

While several embodiments of the invention are herein illustrated and described, it will be understood that further changes may be made in the construction and arrangement of elements without departing from the spirit or scope of the invention. Therefore, without limitation in this respect, the invention is defined by the following claims.

I claim:

1. In a rocket engine of the type having a storage container for a liquid propellant with at least one port in its wall closed by a frangible closure projecting inwardly from the wall and a slide mounted for movement adjacent the wall to shear the closure and having at least one orifice for alignment with the port in the wall to deliver liquid therefrom, the combination of said storage container, said slide and an annular shoulder projecting inwardly from the wall of the container adjacent one side of the closure, an annular shoulder projecting outwardly from the slide adjacent the opposite side of the closure, and means for actuating said slide to shear the closure and compress it between the shoulders on the wall of the container and slide to cushion the movement of the latter.

2. A rocket engine having a container for a liquid propellant with at least one outlet port in the wall and a shoulder adjacent the port, a slide mounted for movement adjacent the wall and having a shoulder spaced from and opposing the shoulder on the wall and an orifice therein for alignment with the outlet port in the wall, a frangible closure for the outlet port in the wall and projecting between the opposed shoulders on the wall and slide, and means for actuating said slide to shear the frangible closure and compress it between the shoulders on the wall of the container and slide to cushion the slide at the end of its movement.

3. A rocket engine in accordance with claim 2 in which the container is of annular shape to form a cylindrical combustion chamber therein, and the slide is of annular shape and slidable along the inner wall of the cylindrical chamber.

4. A rocket engine in accordance with claim 3 in which the shoulders on the wall and slide extend around the entire periphery to form an annular space therebetween, and the frangible closure for the port in the wall extends around the entire periphery of the wall between the shoulders whereby to reduce the width of the closure and the movement of the slide to open the outlet port.

5. A rocket engine in accordance with claim 4 in which the wall has an annular groove around its entire periphery, the frangible closure is of U-shape in cross section having peripheral flanges seated in the recesses in the wall and sealed thereto, and the wall has a plurality of outlet ports located centrally of the annular groove and under the U-shape frangible closure projecting inwardly from the wall.

6. A rocket engine in accordance with claim 2 in which the slide is in the form of a piston, and the means for actuating the slide is a gas generator for delivering gas to the piston under pressure.

7. A rocket engine in accordance with claim 3 in which the container has inner and outer walls to divide the annular space therebetween into separate compartments for liquid fuel and oxidizer, each of said compartments having at least one outlet port therein, the inner wall of the container being stepped to form annular shoulders adjacent one side of each port, the periphery of the slide being stepped to form annular shoulders adjacent the opposite side of each port and spaced from and opposing the shoulders on the wall, a frangible closure for each of the ports in the wall and located between the opposed shoulders on the wall and slide, and said closures when sheared by the slide acting between the spaced shoulders to cushion the slide at the end of its movement.

8. A rocket engine in accordance with claim 7 in which the closures extend around the entire periphery of the wall to decrease the width of the outlet port to produce the flow rate required and thereby reduce the movement of the slide necessary to shear the closures.

9. A rocket engine in accordance with claim 8 in which the slide is in the form of a piston, the inner wall of the container forming a combustion chamber on one side of the slide, a gas generator at the interior of the inner wall at the opposite side of the slide, a source of solid fuel in the gas generator chamber, and an ignitor for igniting the solid fuel to produce gas under pressure acting directly on the piston slide.

References Cited

UNITED STATES PATENTS

| | | | |
|---|---|---|---|
| 3,182,449 | 5/1965 | Kerney et al. | 60—39.48 |
| 3,200,584 | 8/1965 | Mitchell | 60—35.6 |

CARLTON R. CROYLE, Primary Examiner.

DOUGLAS HART, Assistant Examiner.

U.S. Cl. X.R.

60—39.14, 39.48